3,011,949
METHOD OF PROMOTING RELEASE OF ACTIVE INGREDIENTS FROM SLAB CHEWING GUM AND PRODUCT
Anthony G. Bilotti, 221—10 113th Drive, Queens Village, N.Y.
No Drawing. Filed June 10, 1958, Ser. No. 740,998
7 Claims. (Cl. 167—82)

The object of the present invention is to overcome a problem which has existed for many years with regard to the release of active ingredients from slab chewing gum, usually ingredients which are not freely soluble. The said active ingredient is so bound in the gum base, not withstanding the presence of sweeteners, including sugar and corn syrup, that only a small and ineffective portion of the active ingredient is released during normal chewing of the slab gum.

For many years it has been usual practice, in the provision of a chewing gum, carrying active ingredients for nutritional or pharmacological purposes, to deposit the active ingredient upon the exterior of a gum nugget or center, usually with an underlying thin layer of sugar, and to cover the unit with a final layer of hard sugar produced by tumbling the units in coating pans into which saturated solutions of sugar are poured and the water driven out by the action of air, the finished piece being commonly called "candy coated gum." This method of production is costly and eliminates desired slab forms of gum containing such active material.

In the preparation of slab chewing gum, a "base" is first prepared by heating and blending various ingredients such as natural gums, synthetic resins, waxes, fillers, etc. The completed "base" thus obtained is further blended with corn syrup, sugar and one or more flavoring materials. A complete gum batch having a total weight of 100 lbs., generally consists of 20–30 lbs. of base and 70–80 lbs. of corn syrup and sugar, the major portion of the latter being sugar.

In preparing the chewing gum, the above components are placed in a mixing kettle subjected to mild heat, as for example, somewhat above 100° F., and mixing blades or agitators blend the constituents into a homogeneous dough-like mass. The mass is then unloaded from the kettle, cooled, rolled, scored, set and broken into individual slab pieces.

In practice, the filler constituent of the gum base generally is calcium carbonate. It being insoluble, it is locked in the base during chewing of the slab gum, by the bonding action of the base constituents, and the presence of sugar and corn syrup in such slab gum, has no substantial effect in releasing the said insoluble material.

The characteristic of my invention is the discovery that phosphates, chlorophyllins, vitamins, antacids and other active materials, in usual solid powder form, may be incorporated into slab gum, by a prior treatment, that in high and satisfactory degree they will be released into the oral cavity of the person chewing the slab gum, and hence will have desired effect. By this discovery, candy coated gum carriers for such active materials, with their greater cost of production, and also greater proportion of sugar, are rendered unnecessary.

The characteristic of my method consists of forming a coating of wet sugar, preferably a solution of sugar, on the individual solid particles of the active constituents, drying the said coating to harden it, pulverizing and then mixing the coated active ingredient particles with the constituents which complete the slab gum formula as described. The steps leading to individual slabs or sticks are as customary. In chewing the gum slab thus formed, the hard films of sugar encircling the active material particles are very quickly dissolved and they draw out with their solution the active particles themselves to a very high degree.

To illustrate the improvement, experiments were made using dicalcium phosphate incorporated several ways into slab chewing gum. Dicalcium phosphate was shown to have important therapeutic value in experiments conducted in Sweden and the United States. The dicalcium phosphate supplements the supply of calcium and phosphate in the saliva and is an effective agent against the acids that cause tooth decay. However, in order to be effective, the dicalcium phosphate must be released into the saliva in sufficient amounts. To demonstrate the difficulties overcome, in releasing dicalcium phosphate from slab chewing gum, the following experiments were made:

(1) With calcium carbonate mixed with the base, as customary, and the slab gum prepared as specified above, the amount of calcium carbonate released during chewing for about thirty minutes was negligible. When dicalcium phosphate was substituted for the calcium carbonate, release of the phosphate, in the same time of chewing, was about the same as that of the calcium carbonate.

(2) When the dicalcium phosphate was mixed with the "sugar phase," i.e., sugar and corn syrup, and then the mixture was blended with the gum base, there was insufficient improvement because after thirty minutes of chewing slab gum made therefrom, the release of the dicalcium phosphate was in the low range of 10–12%.

(3) To the dicalcium phosphate was added about an equal amount of sugar, the two being thoroughly mixed and wet down to coat the particles of phosphate, and then dried. The dry mixture was pulverized, and added to the gum base plus sugar phase. The ratio was 20% base, corn syrup 20%, and sugar 40% with the addition thereto of the 20% hard sugar coated phosphate powder (1:1) particles. The ingredients as a whole were mixed together in a mixing kettle and carried through customary steps leading to slabs of chewing gum, and the gum tested by chewing for thirty minutes. The release of dicalcium phosphate was nearly 65%.

(4) A still further improvement was found by spray drying the same proportion of mixed sugar solution and dicalcium phosphate powder, then pulverizing, and adding the sugar coated fine particles of dicalcium phosphate to the two specified phases, with continued procedure as before. The result was that, in thirty minutes of chewing, the slab gum so formed released 75% of the dicalcium phosphate.

The dicalcium phosphate was selected as one of many useful examples of powdered active materials in general, of which chlorophyllins, powdered vitamins, and antacid powders, are a few, and which lend themselves to my method. The dicalcium phosphate is of itself merely one of a group of phosphates which may be releasably held in slab chewing gum, their equivalents being the mono- and tri-calcium phosphates. The invention, being particularly applicable to water-insoluble medicaments and active constituents in powdered form, is applicable to any active materials in small particle size which become bound in substantial degree by chewing gum.

In the reference made above for the use of a proportion of sugar, as coating for the phosphate, the same in weight as the weight of the phosphate, such a proportion of sugar is not essential, particularly where the method is carried out by spray-drying the phosphate with sugar in solution, it being only necessary to produce on the individual active ingredient particles, hard films of sugar which will, to satisfactory degree, resist rubbing action in the mixing kettle. It will be understood that the term "slab" is used broadly, inasmuch as while the invention is particularly adapted for the stick or slab types of gum, it is also adapted for different retail units, including the type termed "nuggets."

The invention is particularly useful for slab chewing gum, in that it utilizes water soluble sugars (e.g. sucrose, dextrose or spray dried corn syrup solids) as the release mechanism for the particles of insoluble active ingredients. The water soluble sugars are common to normal slab chewing gums and thus, by making use of the sugars for release, the characteristics of the gum (e.g. flavor, chew, sweating properties) are not changed as would be the case if equivalent amounts of gelatin, sorbitol or gum arabic are used.

Having described my invention, what I claim and desire to secure by Letters Patent is as follows:

1. The method of preparing slab chewing gum having an insoluble gum base and embodying particles of a solid active material which is not freely soluble and which tends to be substantially bound against release from the slab chewing gum in the chewing of the latter, which comprises the step of subjecting a batch of the particles in pulverulent form to the adherent film forming action of a sugar, drying the batch, pulverizing the batch and mixing the powder into a chewing gum body which includes such insoluble gum base in such manner that it is homogeneously distributed in the chewing gum body, and then forming from said body units for use.

2. The method of preparing chewing gum having an insoluble gum base and emobdying pulverulent particles of at least one solid active material which are not freely soluble and which tend to be substantially bound against release from the chewing gum in the chewing of the latter, in which particles of active solid material in powder form are treated with a solution of sugar, the step of drying the solution to form a relatively dry batch, the step of pulverizing the batch and the step of mixing the powder into the said chewing gum base.

3. A slab chewing gum having an insoluble base and containing particles of a solid active material which are not freely soluble and which tend to be substantially bound against release from the chewing gum in the chewing of the latter, the said solid active material being in powder form and the powder particles being discrete and individually coated with relatively dry solid material consisting of sugar, the coated active particles of solid material being in pulverulent condition in the gum base.

4. A chewing gum according to claim 3, in which the solid material in pulverulent form consists of dicalcium phosphate.

5. A slab chewing gum according to claim 3, in which the solid material in pulverulent form consists of a fat soluble vitamin.

6. A slab chewing gum according to claim 3, in which the solid material in pulverulent form consists of an insoluble antacid.

7. A slab chewing gum having an insoluble gum base and containing particles of solid active material which are not freely soluble and which tend to be substantially bound against release from the chewing gum in the chewing of the latter, said particles of active material being in discrete pulverulent form and individually coated with solid sugar, the coated active particles being in pulverulent condition and substantially equally dispersed throughout said gum base.

References Cited in the file of this patent

UNITED STATES PATENTS

| | | |
|---|---|---|
| 1,629,461 | Berg et al. | May 17, 1927 |
| 1,771,982 | Mustin | July 29, 1930 |
| 2,198,165 | Hamburger | Apr. 23, 1940 |